United States Patent
Choi et al.

(10) Patent No.: US 10,949,976 B2
(45) Date of Patent: Mar. 16, 2021

(54) ACTIVE CONTOUR MODEL USING TWO-DIMENSIONAL GRADIENT VECTOR FOR ORGAN BOUNDARY DETECTION

(71) Applicant: Verathon Inc., Bothell, WA (US)

(72) Inventors: Joon Hwan Choi, Bothell, WA (US); Fuxing Yang, Bothell, WA (US)

(73) Assignee: Verathon Inc., Bothell, WA (US)

(*) Notice: Subject to any disclaimer, the term of this patent is extended or adjusted under 35 U.S.C. 154(b) by 114 days.

(21) Appl. No.: 16/006,018

(22) Filed: Jun. 12, 2018

(65) Prior Publication Data

US 2018/0357770 A1    Dec. 13, 2018

Related U.S. Application Data

(60) Provisional application No. 62/518,073, filed on Jun. 12, 2017.

(51) Int. Cl.
G06T 7/149 (2017.01)
G06T 7/13 (2017.01)
(Continued)

(52) U.S. Cl.
CPC .......... *G06T 7/149* (2017.01); *G06K 9/42* (2013.01); *G06K 9/48* (2013.01); *G06T 7/0012* (2013.01);
(Continued)

(58) Field of Classification Search
CPC ......... G06T 7/149; G06T 7/12; G06T 7/0012; G06T 7/13; G06T 2207/30004; G06T 2207/10132; G06T 2207/20116; G06T 7/11; G06T 2207/30096; G06T 2207/10081; G06T 7/20; G06T 2207/30028; G06T 2200/04; G06T 17/10; G06T 2207/30068; G06T 7/136;
(Continued)

(56) References Cited

U.S. PATENT DOCUMENTS 4,177,679 A   12/1979  Soldner
4,209,022 A    6/1980  Dory
(Continued)

OTHER PUBLICATIONS

Guillot, Laurence et al., "Existence and uniqueness results for the Gradient Vector Flow and geodesic active contours mixed model," Arvix.org, Cornell Univeristy Library, 201 Olin Library Cornell University Ithaca, NY 14853, Feb. 9, 2007, 21 pages.

(Continued)

*Primary Examiner* — Nimesh Patel
(74) *Attorney, Agent, or Firm* — Snyder, Clark, Lesch & Chung, LLP

(57) ABSTRACT

A method for determining a contour of an organ in an ultrasound image is performed by a processor in a base unit. The method includes detecting an organ within the ultrasound image; obtaining a centroid position for the organ; extending a set of radial lines from the centroid position beyond an expected organ boundary; determining cost values at candidate nodes on each radial line, of the set of radial lines, by applying costs along gradient vectors that are normal to a contour between adjacent nodes on different radial lines; and selecting a final organ boundary contour based on a cost function analysis of paths through the candidate nodes.

20 Claims, 14 Drawing Sheets

(51) Int. Cl.
*G06T 7/00* (2017.01)
*G06K 9/42* (2006.01)
*G06K 9/48* (2006.01)
*G06T 7/12* (2017.01)

(52) U.S. Cl.
CPC .................. *G06T 7/12* (2017.01); *G06T 7/13* (2017.01); *G06K 2009/485* (2013.01); *G06K 2209/051* (2013.01); *G06T 2207/10132* (2013.01); *G06T 2207/20116* (2013.01); *G06T 2207/30004* (2013.01)

(58) Field of Classification Search
CPC ............. G06T 2207/10088; G06T 7/62; G06T 2207/20084; G06T 5/003; G06T 2207/20081; G06T 2207/20192; G06T 7/0014; G06T 2207/10048; G06T 2207/20108; G06T 2207/20132; G06T 7/143; G06T 7/187; G06T 2210/41; G06T 7/175; G06T 7/40; G06T 2207/20064; G06T 2207/20104; G06T 5/002; G06T 2207/20101; G06T 2207/20161; G06T 2207/30048; G06T 2207/10116; G06T 2207/10072; G06T 2207/20072; G06T 2207/30172; G06T 7/55; G06T 17/00; G06T 19/00; G06T 2207/10028; G06T 7/00; G06T 7/593; G06K 9/48; G06K 9/42; G06K 2009/485; G06K 2209/051; G06K 9/6256; G06K 2209/05; G06K 9/00147; G06K 9/00516; G06K 9/00664; G06K 9/03; G06K 9/6267; G06K 9/6296; G06K 9/3233; G06K 9/20; G06K 9/4652; G06K 9/00621; G06K 9/00711; G06K 9/52; G06K 9/40; G06K 2209/053; G06K 9/522; G06K 9/6207; G06K 9/00355; G06K 9/6228; G06K 9/00127; G06K 9/00201; G06K 9/4628; G06K 9/4638; A61B 1/00009; A61B 8/4472; A61B 8/12; A61B 18/20; A61B 1/0005; A61B 5/7282; A61B 5/7264; A61B 8/08; A61B 1/227; A61B 2018/00351; A61B 2034/2055; A61B 5/0066; A61B 5/1075; A61B 5/1077; A61B 8/0833; A61B 8/4483; A61B 8/461; A61B 8/467; A61B 8/469; A61B 8/483; A61B 8/565; A61B 6/02; A61B 6/466; A61B 6/5235; A61B 34/10; A61B 2034/107; A61B 2090/365; A61B 8/5223; A61B 5/743; G06F 19/00; G06F 19/3481; G06F 19/321; G06F 19/3418; G06F 17/5009; G06F 19/3462; G06F 3/0412; G06F 16/583; G06F 16/7847; G06F 30/20; G06F 3/011; G06F 3/017; G06F 3/0304; G06F 3/0346; G06F 3/04815; G06F 3/04842; G06F 3/04847; G06F 3/0482; A61N 2005/1005; A61N 2/002; A61N 5/1014; G01N 2800/36; G01N 2800/364; G01N 33/57411; G01N 33/57415; G01N 33/689; G01N 33/57407; G01N 33/57484; G01N 2291/02475; G01N 29/0654; G16H 50/20; G16H 40/63; G16H 40/67; G16H 30/40; G16H 15/00; G16H 50/50; G16H 10/00; G16H 20/00; G16H 30/20; G16H 70/20; G16H 80/00; Y10S 378/901; Y10S 128/916; Y10S 128/922; Y10S 128/925; G06N 3/08; G06N 20/00; G06N 20/20; G06N 3/0427; G06N 3/0454; G06N 3/0472; G06N 3/0481; G06N 3/126
See application file for complete search history.

(56) References Cited

U.S. PATENT DOCUMENTS

| | | | |
|---|---|---|---|
| 4,245,511 A | 1/1981 | Soldner | |
| 4,275,597 A | 6/1981 | Quedens et al. | |
| 4,784,147 A | 11/1988 | Moshfeghi | |
| 5,081,995 A | 1/1992 | Lu et al. | |
| 5,492,121 A | 2/1996 | Lu | |
| 5,515,852 A | 5/1996 | Karp et al. | |
| 5,540,228 A | 7/1996 | Li | |
| 5,579,768 A | 12/1996 | Klesenski | |
| 5,797,844 A | 8/1998 | Yoshioka et al. | |
| 6,527,720 B1 | 3/2003 | Ustuner et al. | |
| 6,547,735 B1 | 4/2003 | Henderson | |
| 6,618,206 B2 | 9/2003 | Tarakci et al. | |
| 6,708,055 B2 | 3/2004 | Geiser et al. | |
| 6,778,690 B1 | 8/2004 | Ladak et al. | |
| 6,783,497 B2 | 8/2004 | Grenon et al. | |
| 7,800,284 B2 | 9/2010 | Theuerkauf | |
| 7,819,806 B2 | 10/2010 | Yang et al. | |
| 8,435,181 B2 | 5/2013 | Yang et al. | |
| 8,696,573 B2 | 4/2014 | Shiina | |
| 2002/0102023 A1* | 8/2002 | Yamauchi | G06K 9/6207 382/199 |
| 2007/0167779 A1* | 7/2007 | Kim | A61B 8/08 600/443 |
| 2007/0216678 A1* | 9/2007 | Rouet | G06T 7/0012 345/423 |
| 2008/0240526 A1* | 10/2008 | Suri | G06T 7/12 382/128 |
| 2009/0227869 A1* | 9/2009 | Choi | A61B 5/1075 600/443 |
| 2011/0004101 A1* | 1/2011 | Yang | A61B 8/0858 600/443 |
| 2011/0046927 A1* | 2/2011 | Jeong | G06F 17/13 703/2 |
| 2011/0208059 A1 | 8/2011 | Cerofolini | |
| 2011/0270088 A1 | 11/2011 | Shiina | |
| 2014/0064580 A1* | 3/2014 | Madabhushi | G06T 7/0012 382/128 |
| 2017/0052250 A1 | 2/2017 | Jeong et al. | |
| 2018/0068439 A1* | 3/2018 | Hareland | G06T 7/0012 |
| 2019/0261942 A1* | 8/2019 | Yang | G06T 7/62 |

OTHER PUBLICATIONS

International Search Report and Written Opinion issued in corresponding International Application No. PCT/US2018/037016 dated Aug. 31, 2018, 14 pages.

* cited by examiner

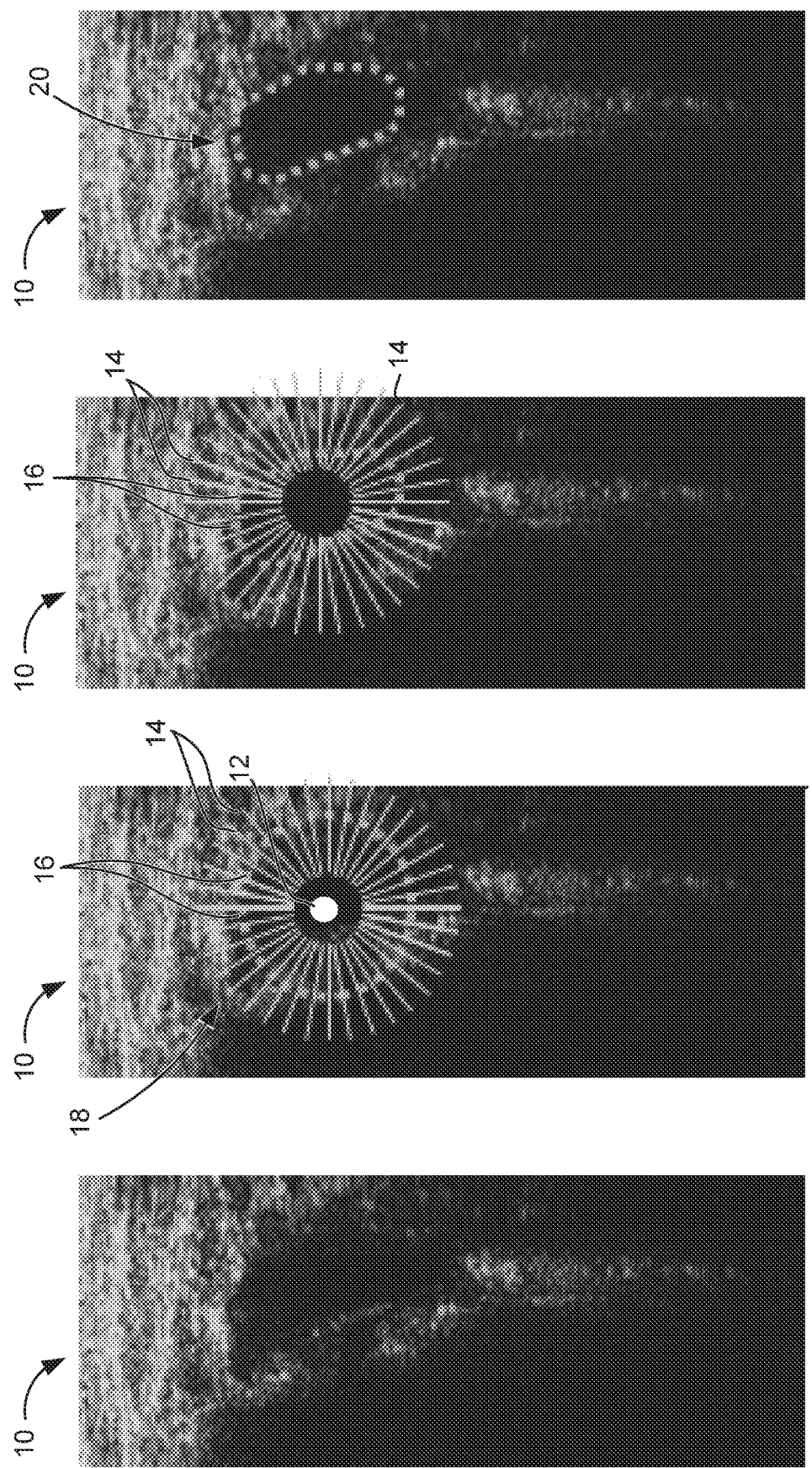

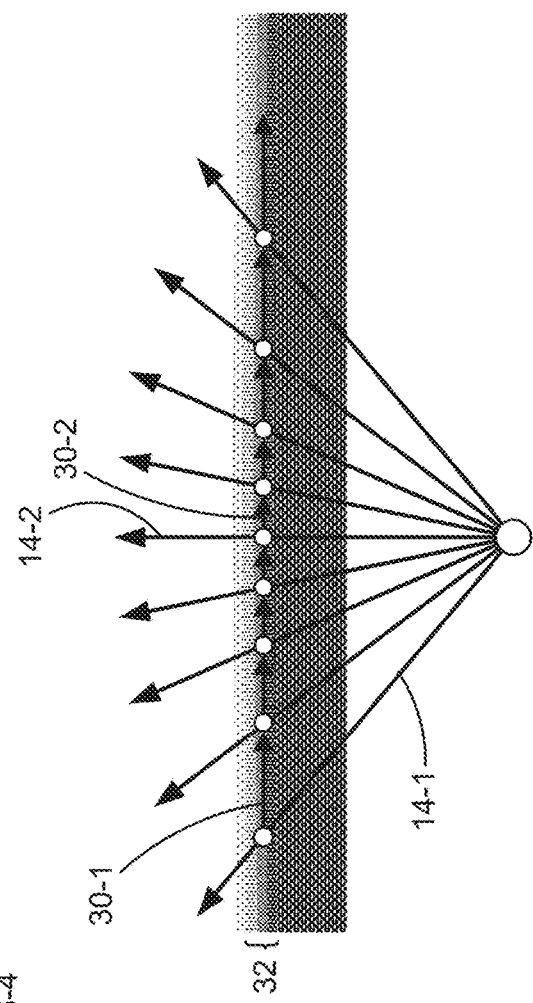
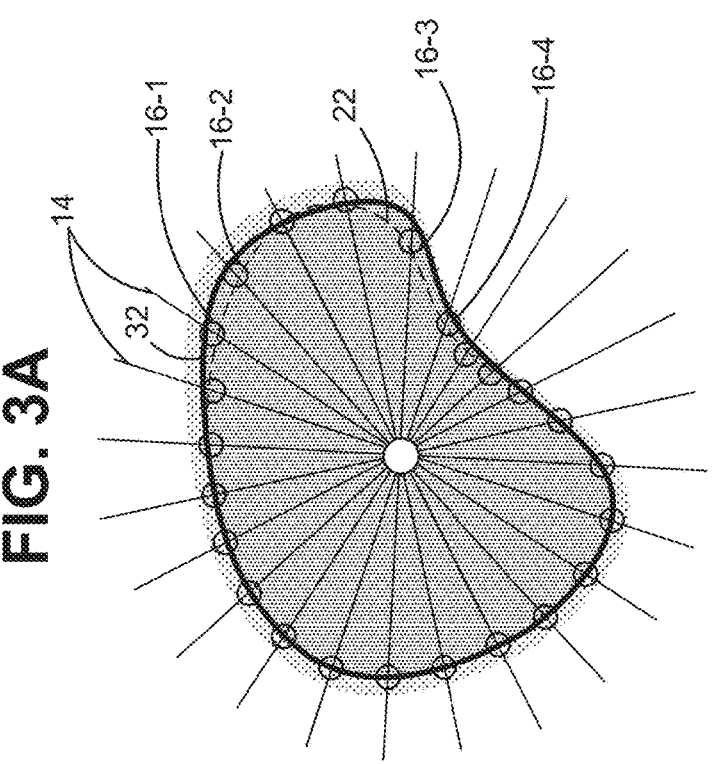

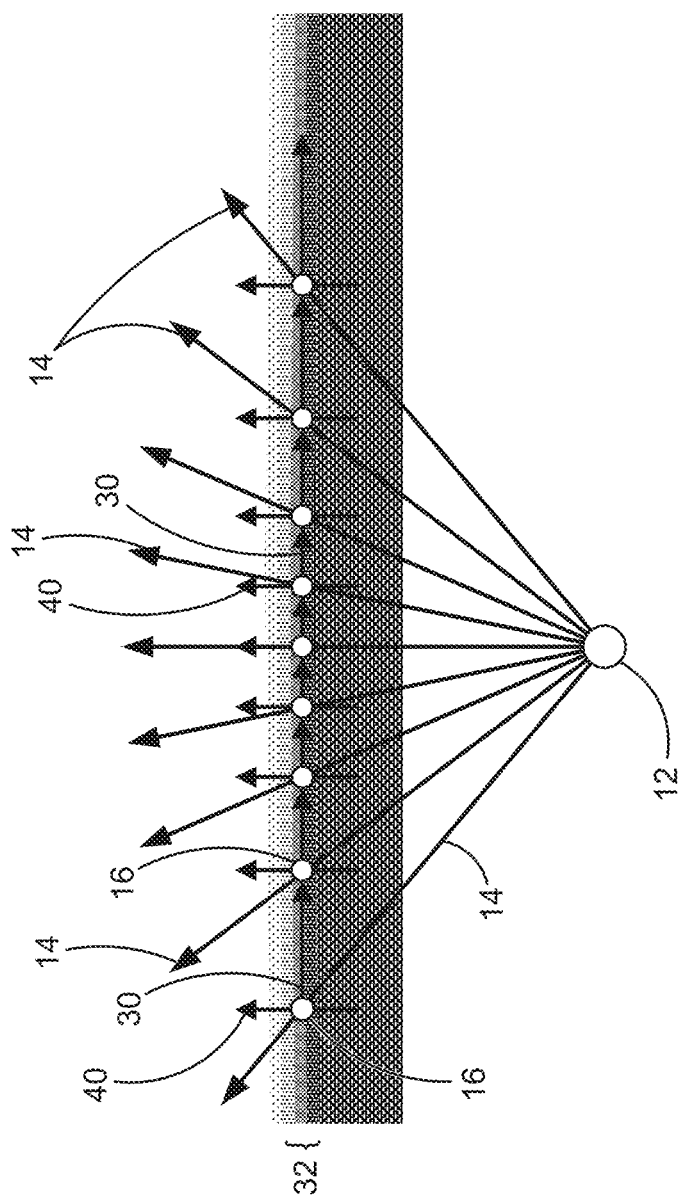

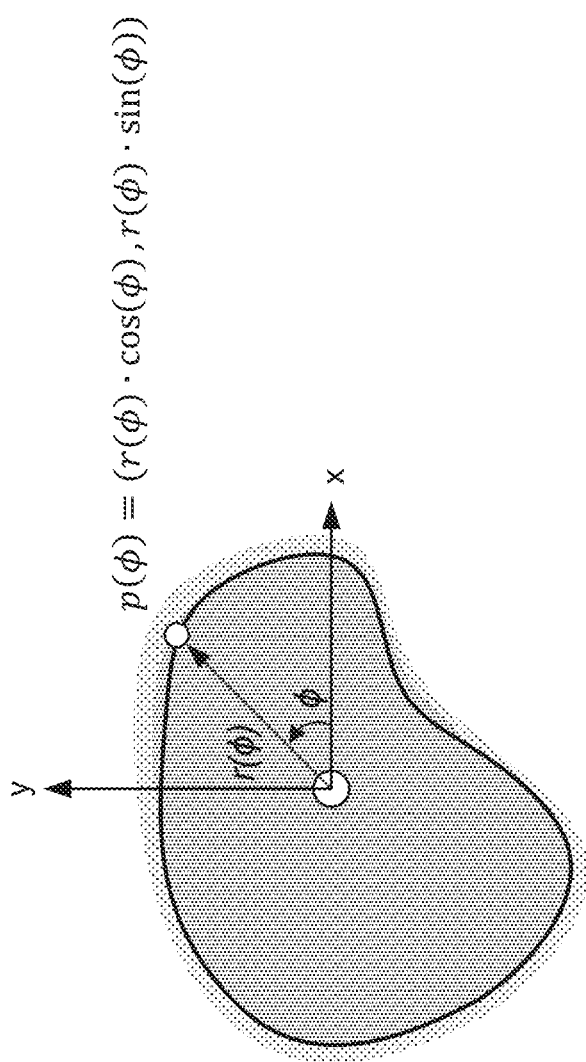

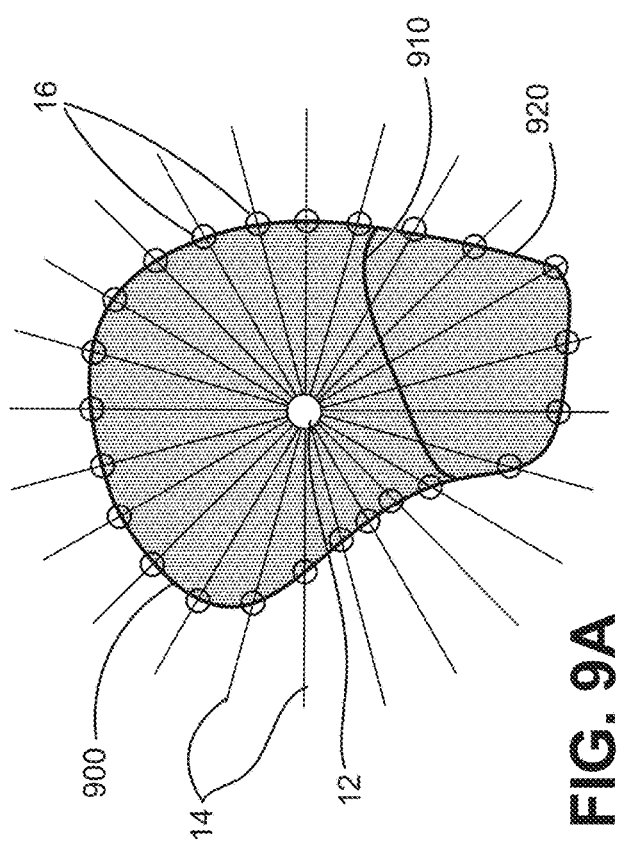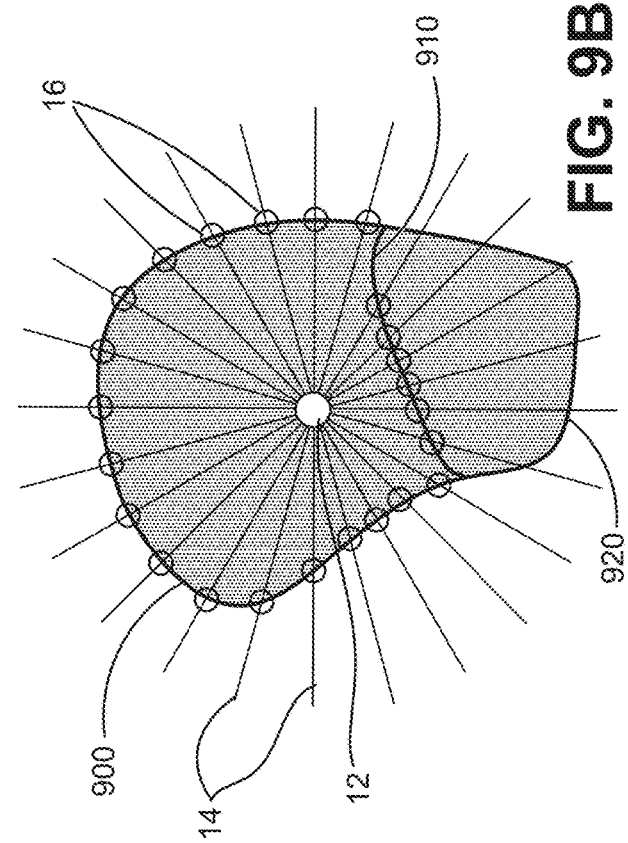

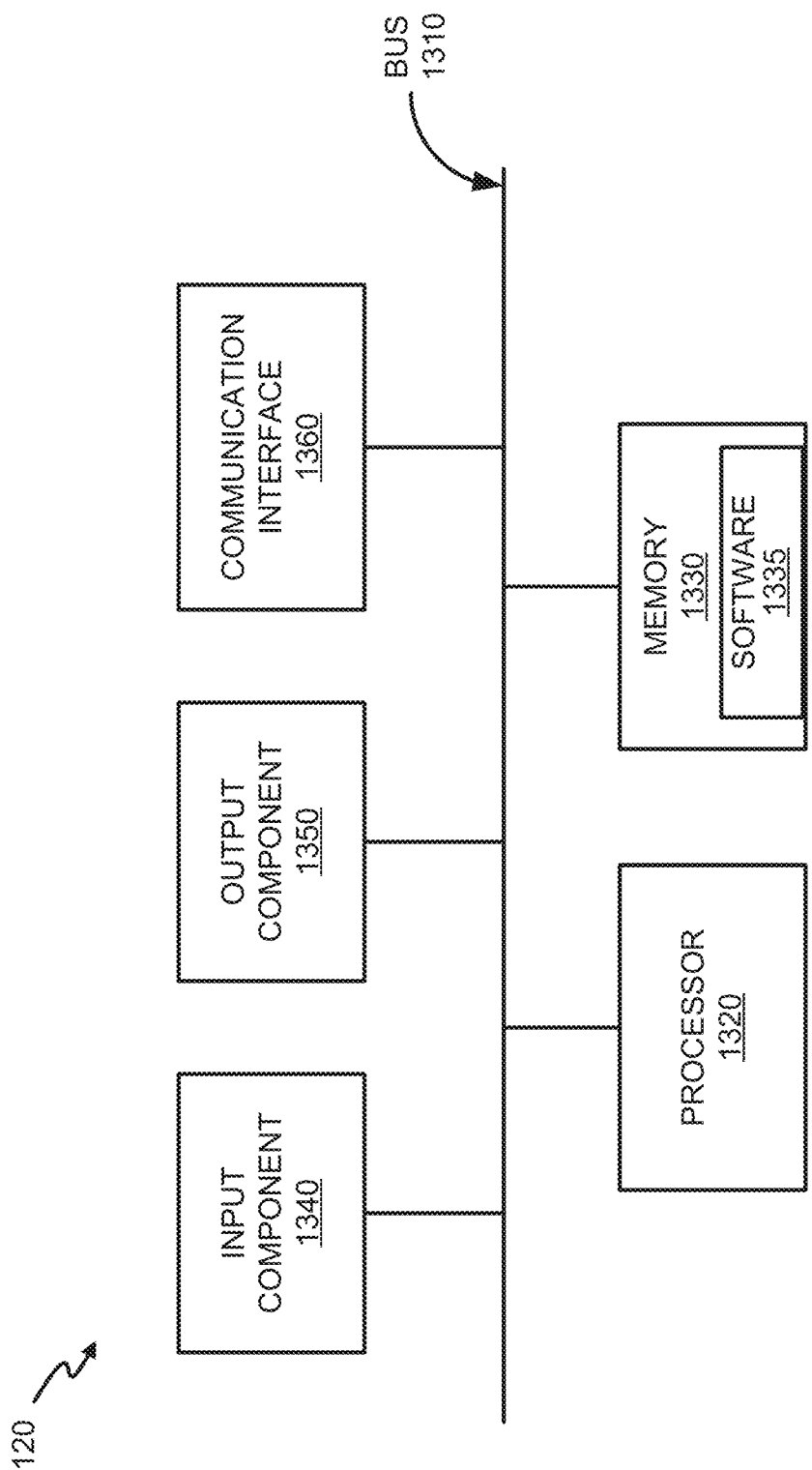

ACTIVE CONTOUR MODEL USING TWO-DIMENSIONAL GRADIENT VECTOR FOR ORGAN BOUNDARY DETECTION

CROSS-REFERENCE TO RELATED APPLICATION

This application claims priority under 35 U.S.C. § 119 based on U.S. Provisional Application No. 62/518,073 filed Jun. 12, 2017, the contents of which are hereby incorporated herein by reference in their entirety.

BACKGROUND OF THE INVENTION

Ultrasound scanners are typically used to identify a target organ or other structures in the body and/or determine features associated with the target organ/structure, such as the size of the organ/structure or the volume of fluid in the organ. In interpreting signals from an ultrasound scan, active contour modeling may be used to processes the signal data sets acquired for a cavity to determine the contour along the cavity-tissue boundary interface. In general, 'active contour model' refers to finding an energy-minimizing curve where the energy depends on its shape and location within an image. The energy is typically defined with external and internal energy terms. Finding the optimal contour generally means finding a combination of nodes in the image that minimizes the energy calculated based on the location of the nodes. Dynamic programming is one technique that can speed up the exhaustive search/optimization process of node selection for an active contour model. While dynamic programming can provide rapid and relatively accurate contour detection for generally circular two-dimensional cavity representations, conventional approaches of active contour modeling using dynamic programming may not be as effective for contour detection of elongated cavities.

BRIEF DESCRIPTION OF THE DRAWINGS

FIGS. 2A-2D illustrate a sequence of images obtained by the scanning system of FIGS. 1A and 1B with the application of active contour modeling using dynamic programming with one-dimensional gradient vectors;

FIGS. 3A and 3B are schematics illustrating application of an active contour model using dynamic programming with a one-dimensional gradient vector;

FIG. 4 is a schematic illustrating application of an active contour model using dynamic programming with a two-dimensional gradient vector;

FIG. 5 is a schematic illustrating a contour model in Cartesian and polar coordinate systems;

FIGS. 9A and 9B are simplified diagrams illustrating a contour that includes a bladder-uterus boundary;

FIG. 13 is a diagram illustrating exemplary components of a base unit in the system of FIGS. 1A and 1B.

DETAILED DESCRIPTION OF THE PREFERRED EMBODIMENTS

The following detailed description refers to the accompanying drawings. The same reference numbers in different drawings may identify the same or similar elements.

Implementations described herein relate to active contour models using dynamic programming with two-dimensional (2-D) gradient vectors to identify contours of organs or structures of interest in a patient based on information obtain via an ultrasound scanner. For example, the scanner may be used to transmit a number of ultrasound signals toward the target organ and echo information associated with transmitted signals may be used to generate an image. Image segmentation may be used to partition the image into multiple segments, such as segments differentiating an organ and its surrounding tissue. Locating the boundary between segments can be regarded as a problem of finding an optimal path between a source node and a destination node inside an image. Active contour models can be used to find the optimal path.

In one implementation, a method for determining a contour of an organ in an ultrasound image is performed by a processor in a base unit. The method may include detecting an organ within the ultrasound image; obtaining a centroid position for the organ; extending a set of radial lines from the centroid position beyond an expected organ boundary; determining cost values at candidate nodes on each radial line, of the set of radial lines, by applying costs along gradient vectors that are normal to a contour between adjacent nodes on different radial lines; and selecting a final organ boundary contour based on a cost function analysis of paths through the candidate nodes. In contrast with previous techniques using active contour models with dynamic programming, and as described further herein, implementations described herein identify a gradient direction that is perpendicular to a potential boundary wall to calculate cost values at each of the candidate nodes. These cost values may be used to determine an optimal path cost, through the candidate nodes, that represents a best fit of the organ boundary contour. The term "dynamic programming" as used herein generally refers to application of active contour models using dynamic programming.

Figure 1A:
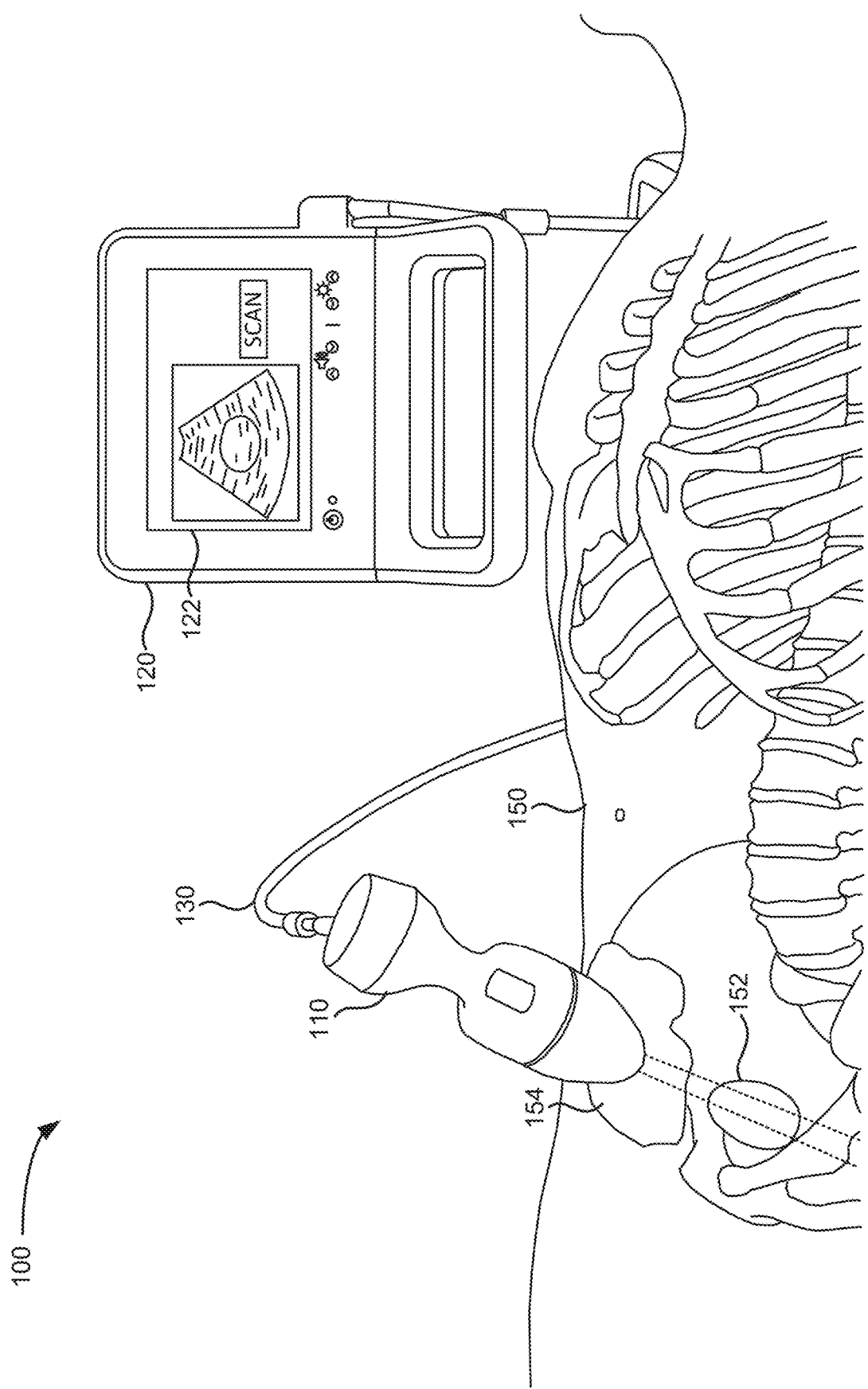
FIG. 1A is a schematic of a scanning system in which systems and methods described herein may be implemented.

FIG. 1A is a schematic of a scanning system 100 in which systems and methods described herein may be implemented. Referring to FIG. 1, scanning system 100 includes probe 110, base unit 120, and cable 130.

Probe 110 includes a handle portion, a trigger, and a nose (or dome) portion. Medical personnel may hold probe 110 via the handle and press the trigger to activate one or more ultrasound transceivers, located in the nose portion, to transmit ultrasound signals toward a target organ of interest. For example, as shown in FIG. 1A, probe 110 is located on pelvic area of patient 150 and over a target organ of interest, which in this example is the patient's bladder 152.

The dome of probe 110 is typically formed of a material that provides an appropriate acoustical impedance match to an anatomical portion and/or permits ultrasound energy to be properly focused as it is projected into the anatomical portion. For example, an acoustic gel or gel pads, illustrated at area 154 in FIG. 1A, may be applied to patient's skin over the region of interest (ROI) to provide an acoustical impedance match when the dome is placed against the skin.

Probe 110 includes one or more ultrasound transceiver elements and one or more transducer elements (not visible in FIG. 1A) within the dome that transmit ultrasound energy outwardly from the dome, and receive acoustic reflections or echoes generated by internal structures/tissue within the anatomical portion. For example, the one or more ultrasound transducer elements may include a one-dimensional, or a two-dimensional array of piezoelectric elements that may be moved within the dome by a motor to provide different scan directions with respect to the transmission of ultrasound signals by the transceiver elements. Alternatively, the transducer elements may be stationary with respect to probe 110 so that the selected anatomical region may be scanned by selectively energizing the elements in the array.

Probe 110 may communicate with base unit 120 via a wired connection, such as via cable 130. In other implementations, probe 110 may communicate with base unit 120 via a wireless connection (e.g., Bluetooth, WiFi, etc.). In each case, base unit 120 includes display 122 to allow a user to view processed results from an ultrasound scan, and/or to allow operational interaction with respect to the user during operation of probe 110. For example, display 122 may include an output display/screen, such as a liquid crystal display (LCD), light emitting diode (LED) based display, or other type of display that provides text and/or image data to a user. For example, display 122 may provide instructions for positioning probe 110 relative to the selected anatomical portion of patient 150. Display 122 may also display two-dimensional or three-dimensional images of the selected anatomical region.

In some implementations, display 122 may include a graphical user interface (GUI) that allows the user to select various features associated with an ultrasound scan. For example, when system 100 is used as bladder scan system, display 122 may allow a user to select whether patient 150 is male, female or a child. This allows system 100 to automatically adapt the transmission, reception and processing of ultrasound signals to the anatomy of a selected patient, such as adapt system 100 to accommodate various anatomical details of male and female patients. For example, when a male patient is selected via the GUI on display 122, system 100 may be configured to locate a single organ cavity, such as a urinary bladder in the male patient. In contrast, when a female patient is selected via the GUI, system 100 may be configured to image an anatomical portion having multiple cavities, such as a bodily region that includes a bladder and a uterus. Similarly, when a child patient is selected, system 100 may be configured to adjust the transmission based on the smaller size of the child patient. In alternative implementations, system 100 may include a cavity selector configured to select a single cavity scanning mode, or a multiple cavity-scanning mode that may be used with male and/or female patients. The cavity selector may thus permit a single cavity region to be imaged, or a multiple cavity region, such as a region that includes an aorta and a heart to be imaged. In addition, the selection of the type of patient (e.g., male, female, child) may be used when analyzing the images to aid in providing an accurate representation of the target organ, as described in detail below.

To scan a selected anatomical portion of a patient, the dome of probe 110 may be positioned against a surface portion of patient 150 as illustrated in FIG. 1A that is proximate to the anatomical portion to be scanned. The user actuates the transceiver and transducer elements, causing the transceiver to transmit ultrasound signals into the body and receive corresponding return echo signals that may be at least partially processed by the transceiver to generate an ultrasound image of the selected anatomical portion. In a particular embodiment, the transceiver transmits ultrasound signals in a range that extends from approximately about two megahertz (MHz) to approximately 10 or more MHz (e.g., 18 MHz).

In one embodiment, probe 110 may be coupled to a base unit 120 that is configured to generate ultrasound energy at a predetermined frequency and/or pulse repetition rate and to transfer the ultrasound energy to the transceiver. Base unit 120 also includes one or more processors or processing logic configured to process reflected ultrasound energy that is received by the transceiver to produce an image of the scanned anatomical region.

In still another particular embodiment, probe 110 may be a self-contained device that includes a microprocessor positioned within the probe 110 and software associated with the microprocessor to operably control the transceiver and transducer elements, and to process the reflected ultrasound energy to generate the ultrasound image. Accordingly, a display on probe 110 may be used to display the generated image and/or to view other information associated with the operation of the transceiver. For example, the information may include alphanumeric data that indicates a preferred position of the transceiver prior to performing a series of scans. In other implementations, the transceiver may be coupled to a general-purpose computer, such as a laptop or a desktop computer that includes software that at least partially controls the operation of the transceiver and transducer elements, and also includes software to process information transferred from the transceiver so that an image of the scanned anatomical region may be generated.

Figure 1B:
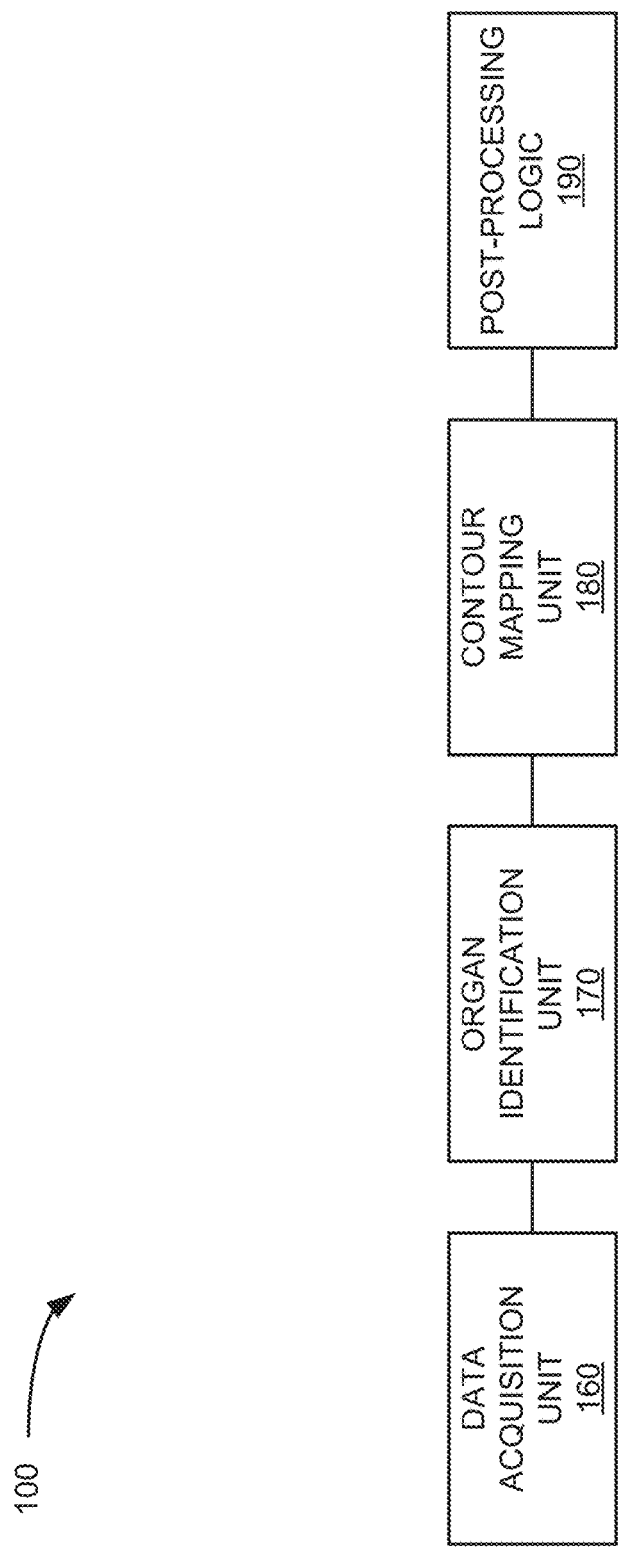
FIG. 1B is a block diagram of functional logic components implemented in the system of FIG. 1A in accordance with an exemplary implementation.

FIG. 1B is a block diagram of functional logic components implemented in system 100 in accordance with an exemplary implementation. Referring to FIG. 1B, system 100 includes a data acquisition unit 160, an organ identification unit 170, a contour mapping unit 180, and post-processing logic 190. In an exemplary implementation, data acquisition unit 160 may be part of probe 110 and the other functional units (e.g., organ identification unit 170, contour mapping unit 180, and post-processing logic 190) may be implemented in base unit 120. In other implementations, the particular units and/or logic may be implemented by other devices, such as via computing devices or servers located externally with respect to both probe 110 and base unit 120 (e.g., accessible via a wireless connection to the Internet or to a local area network within a hospital, etc.). For example, probe 110 may transmit echo data and/or image data to a processing system via, for example, a wireless connection (e.g., WiFi or some other wireless protocol/technology) that is located remotely from probe 110 and base unit 120.

As described above, probe 110 may include a transceiver that produces ultrasound signals, receives echoes from the transmitted signals and generates B-mode image data based on the received echoes. In an exemplary implementation, data acquisition unit 160 obtains data associated with multiple scan planes corresponding to the region of interest in patient 150. For example, probe 110 may receive echo data that is processed by data acquisition unit 160 to generate two-dimensional (2-D) B-mode image data to determine bladder size and/or volume. FIG. 2A illustrates a sample image 10 that may be generated by data acquisition unit 160.

In other implementations, probe 110 may receive echo data that is processed to generate three-dimensional (3D) image data that can be used to determine bladder size and/or volume.

Organ identification unit 170 may perform pre-processing of an image (e.g., image 10) and detect if a substantially spherical cavity or other organ indicator is present within a region of interest based, for example, on differentiation of pixel intensity (e.g., as scanned and collected by data acquisition unit 160). As examples of pre-processing, organ identification unit 170 may apply noise reduction, adjust the aspect ratio of the raw B-mode image, and/or apply a scan conversion. As an example of cavity identification, in a 2-D image, a cavity may be identified as a dark region within an area of lighter-shaded pixels (where the lighter-shaded pixels typically represent body tissues).

Contour mapping unit 180 may receive data from data acquisition unit 160 or organ identification unit 170 and analyze the pixel-by-pixel data. In one implementation, contour mapping unit 180 may apply a dynamic programming method to processes signal data sets acquired for the spherical-like cavity to determine the contour along an organ boundary, such as a cavity-tissue boundary interface. FIG. 2B is a sample radial overlay 18 on the image 10 of FIG. 2A showing a general approximation of a spherical cavity contour. A substantially spherical cavity may not be an exact ball-shaped or round cavity, but may include an uneven spherical shape, for example, an oval-like grapefruit shape, or an asymmetrical or slightly lopsided spherical shape. As shown in FIG. 2B, a seed boundary pixel candidate 12 (also referred to as "centroid 12") is defined and radial profile lines 14 (e.g., at fixed radial increments) are aligned onto the 2-D image for dynamic processing. Nodes 16, which may include a local collection of pixels, are placed in approximate locations along each radial profile line 14. Nodes 16 are optimally placed along gradient points in the image (e.g., where directional change in the intensity or color of the image is detected). While several radial lines 14 and nodes 16 are shown in the simplified example of FIG. 2B, in other implementations, hundreds of radial lines 14 and nodes 16 may be used.

As shown in FIG. 2C, dynamic programming techniques may then be used to identify the gradient point along each radial line 14 that best defines the contour boundary. As shown in FIG. 2D, a boundary estimate 20 may be approximated based on the compiled location of nodes 16 at gradient points that approximate the contour boundary. Thus, a two-dimensional cavity image may include a cavity with a non-circular shape in contrast with the general approximation that may be provided by organ identification unit 170. As described further herein, accurate detection of each gradient point location is essential to accurately determine, for example, the contour along a cavity-tissue boundary interface. Particularly, the perpendicular orientation of vectors (relative to an active contour) can be used to calculate gradients across candidate nodes 16 and assign cost values to more accurately predict boundary estimate 20.

Post-processing logic 190 may provide additional analysis of a defined organ, such as cavity-type recognition, volume estimations, or other information about a cavity defined by contour mapping unit 180. For example, based on boundary estimate 20, post-processing logic 190 may identify a cavity as a bladder and estimate a volume for the bladder.

The exemplary configurations illustrated in FIGS. 1A and 1B are provided for simplicity. System 100 may include more or fewer logic units/devices than illustrated in FIGS. 1A and 1B. For example, system 100 may include multiple data acquisition units 160 and multiple processing units that process the received data. In addition, system 100 may include additional elements, such as communication interfaces (e.g., radio frequency transceivers) that transmit and receive information via external networks to aid in analyzing ultrasound signals to identify a target organ of interest. Furthermore, while illustrations and descriptions herein primarily refer to bladder applications, other embodiments can be applied to wall boundary detection of other organs, such as a prostate/kidney boundary, blood vessels (including aorta), thyroid, etc.

FIG. 3A is simplified illustration of radial vectors applied to an organ of interest. FIG. 3B is a schematic showing radial lines 14 applied to a portion of an elongated organ boundary. As shown in FIG. 3A, gradient information in a radial direction (e.g., along each radial line 14) is typically used in active contour models in polar coordinates. While radial gradient works well for cavities with circular shape, it may not work well for cavities with elongated shapes. For example, applying a typical radial gradient to the non-circular cavity in FIG. 3A, some of the radial gradient values, such as those shown at nodes 16-1 through 16-4, on the cavity wall 32 may not be large enough to be detected because directions of some radial profile lines 14 are far from being perpendicular to the cavity wall 32 due to the elongated wall shape.

As shown in FIG. 3B, although cavity wall 32 is of a uniform thickness, the radial gradient values along each radial line 14 are not uniform due to the difference in angles between cavity wall 32 and the direction of gradient along radial lines 14. Radial line 14-1, for example, with a non-perpendicular orientation to cavity wall vector 30-1, has a longer path through cavity wall 32 than radial line 14-2, with a nearly perpendicular orientation to cavity wall vector 30-2. In cases such as radial line 14-1, external energy of the contour (e.g., which controls the fit of a contour) may not be low enough to make the contour stretch to corners of the cavity, which may result in the inaccurate contour 22 of FIG. 3A.

One of the typical approaches to overcome the inaccurate fit of contour 22 is to make image profiles along the arbitrary shaped path. That is, after initial contour detection using the typical method in polar coordinates (FIGS. 2A-2D), new gradient values can be calculated along the profiles at each candidate node 16 perpendicular to the initial contour path. These new gradient values can be more accurate than those calculated during the initial detection because the new profiles are closer to being perpendicular to the organ wall. Repeating the secondary profile calculation multiple times can provide an accurate boundary wall contour. However, the iterative nature of applying perpendicular profiles along each new contour path (sometimes referred to as arbitrary coordinates) slows processing times, which can be a drawback in a real-time aiming mode of probe 110. Furthermore, the gradient information from these profile calculations may not be combined (or easily combined) with other useful contour detection features. Thus, a more effective technique for gradient detection in active contour models using dynamic programming is provided.

FIG. 4 is a schematic showing radial lines 14 applied to a portion of an elongated cavity wall 32 with 2-D gradient vectors. In FIG. 4, full 2-D gradient vector information is applied at each node 16 (e.g., in contrast with one-dimensional (1-D) radial gradients of FIG. 3B). Thus, a gradient in the direction 40 perpendicular to the contour (e.g., cavity wall vector 30) can be calculated at each node 16 in FIG. 4.

To use the 2-D gradient vector, the typical dynamic programming equation for 1-D radial gradients is modified, as described below.

FIG. 5 is simplified illustration of a polar coordinate system applied to an organ cavity of interest. Using the contour model in FIG. 5, typical dynamic programming in polar coordinates is defined as a process to minimize the summation of the internal and external energies (or costs) as described in the following equation:

$$E_{total}(r(\phi)) = \int_0^{2\pi}(w_i * E_i(r(\phi)) + w_e * E_e(r(\phi)))d\phi,$$

where $\phi$ is the radial angle; r is the radius; and $E_i$, $E_e$, $w_i$, and $w_e$ represent internal energy, external energy, internal weight factor, and external weight factor values, respectively. The internal energy value, $E_i$, controls the deformations made to the contour, and the external energy value, $E_e$, controls the fitting of the contour onto the image. In this equation, external energy $E_e$ is typically defined as the gradient (or absolute value of the gradient) in the radial direction as follows:

$$E_e(r) = -\frac{d}{dr}I(\phi, r),$$

where $I(\phi, r)$ is the image intensity at ($\phi$,r). In contrast to this definition, the proposed 2-D vector-based method uses gradient in a direction perpendicular to the contour—that is the gradient projected onto the normal vector of the contour. A normal vector of the contour $n(\phi, r)$ can be calculated using the matrix:

$$n(\phi) = \begin{bmatrix} \frac{d}{d\phi}y(\phi) \\ -\frac{d}{d\phi}x(\phi) \end{bmatrix}.$$

With gradient projected on the normal vector, the new external energy, $E_{e,vector}$, becomes:

$$E_{e,vector}(r) = \frac{n(\phi)}{\|n(\phi)\|} \cdot \nabla I(x, y),$$

where I(x,y) is the image intensity at (x,y) in Cartesian coordinates.

The value of $n(\phi)$ depends on the relative position of the two consecutive nodes 16 on the contour. As all possible node positions are located regularly on the radial lines (e.g., radial profile lines 14) spread out from the centroid (e.g., seed boundary pixel candidate 12), the number of possible values of $n(\phi)$ is limited. So, this vector-based external energy calculation process can be expedited using look-up tables.

The external energy equation for $E_{e,vector}$ above calculates the image gradient along the direction of the radial angled), which is perpendicular to the contour. In another implementation, $E_{e,vector}$ may be generalized so that something else other than gradient is used as a feature. Particularly, $$E_{e,vector}(r) = F(x,y;I,\phi),$$

where $F(x,y;I,\phi)$ represents a feature of image I at (x,y) in the direction of $\phi$. F can be any feature that is calculated on a 2-D image in a certain direction; e.g., gradient, higher-order derivative, Gabor filter output, multidirectional wavelet filter output, etc., or any combinations of two or more of them.

Figure 6:
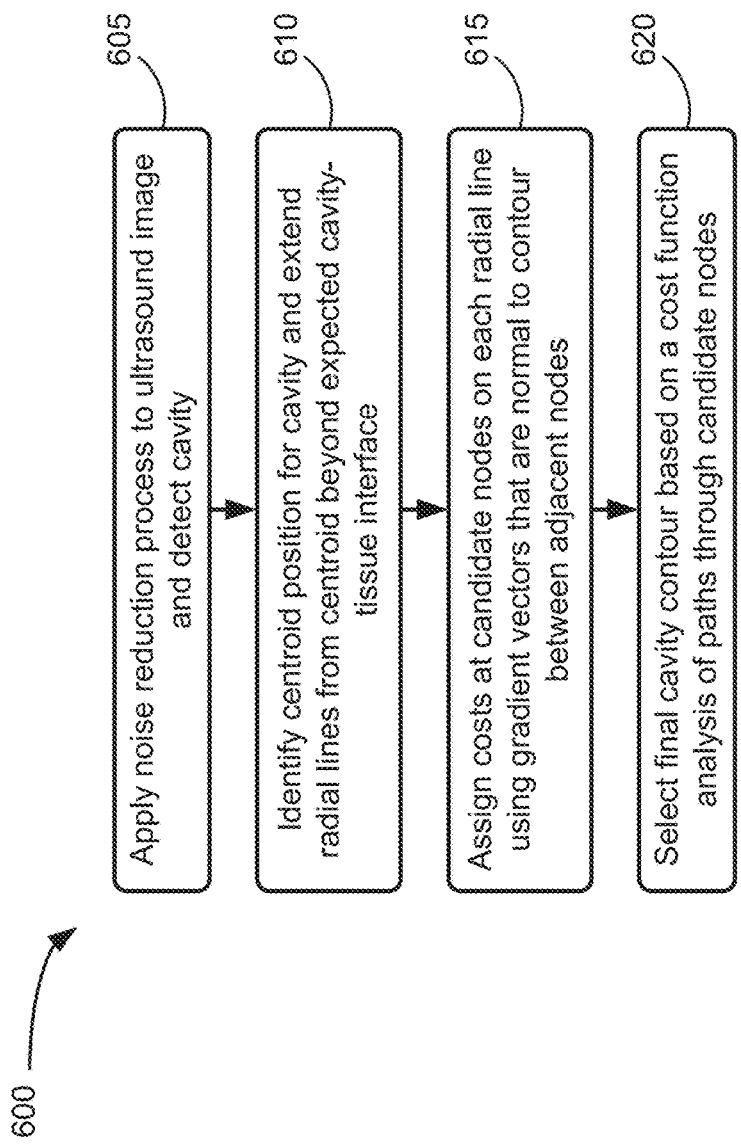
FIGS. 6 and 7 are process flow diagrams for applying an active contour model using dynamic programming with a two-dimensional (2-D) gradient vector for organ wall detection.

FIG. 6 is a flow diagram illustrating exemplary process 600 for using dynamic programming with a 2-D gradient vector for organ wall detection. Process 600 may be performed, for example, by base unit 120 of system 100. In one implementation, processing may begin after probe 110 obtains an ultrasound image as described above.

Process 600 may include applying noise reduction process to an ultrasound image and detecting an organ (block 605). For example, base unit 120 (e.g., data acquisition unit 160) may receive a B-mode ultrasound image from probe 110 and apply noise reduction and/or other pre-processing techniques to remove speckle and background noise from the image. In some embodiments, the aspect ratio of the raw B-mode image can be adjusted through a resizing process to compensate for differences between axial and lateral resolution. In other implementations, such as bladder scanning applications, a scan conversion can also be applied to make the bladder shape closer to the actual shape. Base unit 120 (e.g., organ detection unit 170) may detect an organ or region of interest using other processing logic, such as detection of a concentration of dark pixels within the ultrasound image. In another implementation, base unit 120 may include a user interface (e.g., a touch screen, tablet, mouse, etc.) to allow an operator to indicate an organ of interest.

Process 600 may further include identifying a centroid position for the organ and extending radial lines from a pixel center beyond an expected organ boundary (block 610). For example, base unit 120 (e.g., contour mapping unit 180) may estimate a central position of the cavity in the ultrasound image. Base unit 120 may apply, at the central position, a seed boundary pixel candidate 12 with radial lines 14 extending therefrom, such that each of the radial vectors extends beyond the cavity boundary. The distance of radial lines 14 may be based on the approximate size of the region of interest (e.g., the dark pixels), an expected organ size for a patient (e.g., man, woman, or child), or a default distance. In another implementation, the centroid position may be manually indicated by a user (e.g., an ultrasound technician) using, for example, a touchscreen user interface of base unit 120.

Process 600 may further include assigning costs at candidate nodes on each radial line using gradient vectors that are normal to contour between adjacent nodes (block 615). For example, base unit 120 (e.g., contour mapping unit 180) may identify a potential contour between nodes 16 on adjacent radial lines 14 and define a gradient vector that is normal to the potential contour. Base unit 120 may then compare intensity of the adjacent pixels along the gradient vector to define a cost value for the node. Block 615 is described further in connection with FIG. 7.

Process 600 may additionally include selecting a final organ boundary contour based on a cost function analysis of paths through the candidate nodes (block 620). For example, base unit 120 (e.g., contour mapping unit 180) may apply a cost function analysis to determine a least cost pathway between nodes and extract the closed boundary contours defining the cavity-tissue interface. The cost function analysis may include, for example, a fast marching live wire algorithm. According to an implementation, the live wire algorithm produces a cost function to construct the optimal closed circuit path from starting node, so as to achieve the purpose of boundary detection. Other cost function algorithms may be used to similar purpose.

Figure 7:
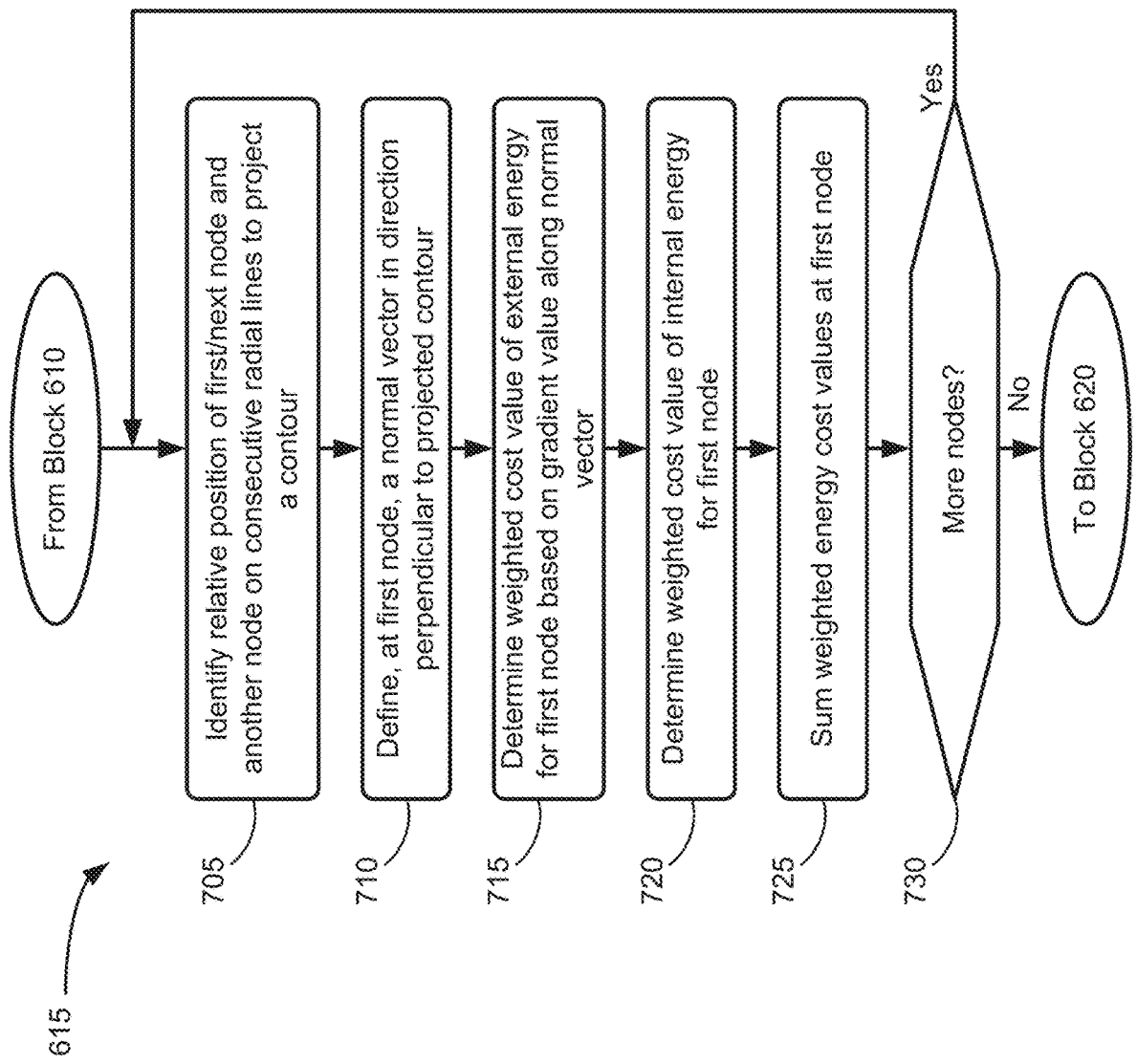
Figure 8:
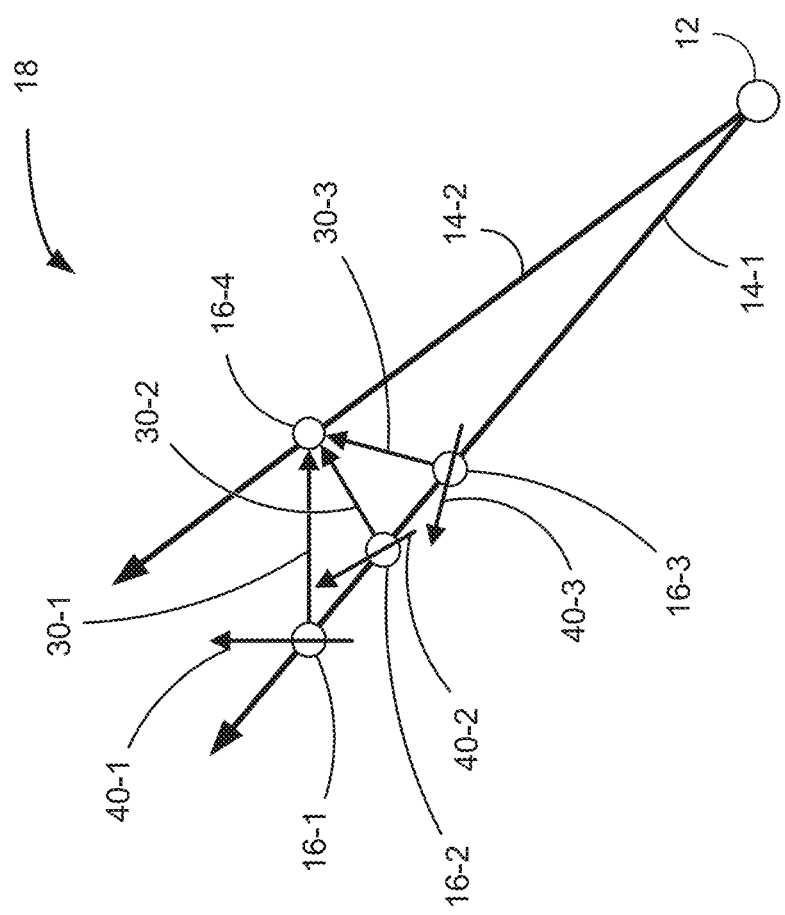
FIG. 8 is a simplified illustration of a portion of a radial overlay for an ultrasound image.

In one implementation, process block 615 may include the process blocks of FIG. 7. Descriptions of FIG. 7 include reference to FIG. 8. FIG. 8 is a simplified illustration of a portion of radial overlay 18 for an ultrasound image. Referring to FIG. 8, radial lines 14-1 and 14-2 may extend from seed boundary pixel candidate 12. Candidate nodes 16-1, 16-2, and 16-3 may be assigned at intervals along radial line 14-1; and candidate node 16-4 may be assigned along radial line 14-2. Only four nodes 16 are shown for simplicity. In practice, several candidate nodes 16 may be assigned along each radial line 14.

Referring to FIG. 7, process block 615 may include identifying a relative position of a first/next node and another node on consecutive radial lines to project a contour (block 705). For example, base unit 120 (e.g., contour mapping unit 180) may apply radial overlay 18 to a region of interest and identify a projected contour between selected nodes. As shown in FIG. 8, a first node 16-1 along radial line 14-1 and a second node 16-4 along radial line 14-2 may be initially selected. A projected contour line 30-1 between node 16-1 and node 16-2 may be defined.

Referring again to FIG. 7, process block 615 may include defining, at the first node, a normal vector in a direction perpendicular to the projected contour (block 710). For example, referring to FIG. 8, base unit 120 may identify at node 16-1 a normal vector 40-1 (e.g., corresponding to n(ϕ) described above) based on projected contour line 30-1. Normal vector 40-1 may represent a gradient direction (e.g., perpendicular to the instantaneous contour direction indicted by projected contour line 30-1).

Referring again to FIG. 7, process block 615 may include determining a weighted cost of external energy for the first node based on gradient value along the normal vector (block 715). For example, base unit 120 may calculate for node 16-1 an energy gradient projected on normal vector 40-1 (corresponding to $E_{e,vector}(r)$ described above). Weights (e.g., $w_e$) may be applied to the gradient to account for particular organ characteristics and the like. As described further herein, weight value may be adapted for different locations around seed boundary pixel candidate 12.

Referring back to FIG. 7, process block 615 may include determining a weighted cost of internal energy for first node (block 720), and summing the weighted energy costs at the first node (block 725). For example, base unit 120 may calculate for node 16-1 an internal energy value, $E_i(r(\phi))$. In one implementation, the internal energy may be simply represented as follows:

$$E_i(r(\phi_k))=(r(\phi_k)-r(\phi_{k-1}))^2,$$

where $\phi_k$ is the angle of the profile corresponding to the k-th node on the contour. In another implementation, the internal energy may be represented with a more a linear prediction error:

$$E_i(r(\phi_k))=|r(\phi_k)-L_\beta(r(\phi_{k-1}, \ldots, \phi_{k-\beta})|^\alpha,$$

where $L_\beta(\bullet)$ is β-th order optimal linear predictor. $L_\beta(\bullet)$ predicts the best current candidate position based on the previous recent node positions. If recent consecutive node points are smooth showing a linear shape, the linear prediction error will be small, thus internal energy will be small. If α=2 and β=1, the above equation becomes the simplest case for internal energy. Other options beyond the linear prediction error, include (but are not limited to): variance of the adjacent node positions, maximum distance between the adjacent nodes, estimated instantenous curvature at the current node, or any combination. However determined, a weight value may be added to the internal energy values.

Base unit 120 may then add the weighted internal energy values and weighted external energy values for node 16-1.

Process block 615 may further include determining if there are more nodes to analyze (block 730). For example, base unit 120 may determine if cost values for other nodes along the radial overlay 18 are required to complete a contour analysis. If there are more nodes to analyze (block 730—yes), process block 615 may return to block 705 to repeat the procedure for another node. For example, referring to FIG. 8, base unit 120 could select node 16-2 and apply a new projected contour 30-2 between nodes 16-2 and 16-4.

If there are no more nodes to analyze (block 730—no), process block 615 may return to process block 620. For example, after cost values for all nodes 16 (or all relevant nodes 16) on all radial lines 14 have been completed, base unit 120 may determine a least cost path through nodes 16 to define a contour for the organ.

The application of 2-D gradient vectors to active contour models using dynamic programming described herein provides demonstrable improvement over active contour models using conventional dynamic programming (e.g., with 1-D vectors). Furthermore, contours may be calculated without multiple iterations, such as may be required with application of arbitrary coordinates described above. However, in some implementations, it may be beneficial to combine gradient information with other useful boundary detection features. For example, FIG. 9A illustrates a contour 900 that includes a bladder-uterus boundary 910. Since contour 900 contains a uterus with a bladder in combination, it is not a correct contour (e.g., for a bladder scan). Therefore, the assigned cost along contour section 920 should be high during the dynamic programming process to avoid selection of section 920 as the minimum cost boundary. To assign this additional cost, another feature may be added that describes the existence of uterus-bladder boundary for each node/profile.

For example, to detect uterus-bladder boundary 910, the gradient information in a radial direction may be used. However, similar to the deficiencies of organ boundary detection described above, the radial gradient could be less efficient when the uterus-bladder boundary is not perpendicular to the radial line. Thus, using a feature that is independent of direction at the uterus-bladder boundary would be desirable. As the uterus-bladder boundary looks like a linear structure on the B-mode image (i.e., like a blood vessel), techniques similar to vessel detection may be used for this purpose. One example of a vessel detection method calculates divergence of gradient. Since the divergence-of-gradient value is not a vector but scalar, it does not depend on the direction of the radial line 14 that corresponds to each node 16. In ultrasound images, the uterus-bladder boundary (e.g., boundary 910) typically shows up as a bright line. That is, the gradient vectors tend to 'converge' on the boundary. Thus, by calculating maximum negative divergence of gradient along a radial line 14, it can be estimated if a radial line crosses the uterus-bladder boundary or not. Incorporating this divergence information into the total energy equation described above, the equation becomes:

$$E_{total}(r(\theta))=\int_0^{2\pi}(w_i*E_i(r(\theta))+w_e*E_e(r(\phi))+w_d \cdot E_d(r(\phi)))d\phi,$$

where $$E_d=\max_{1 \le \rho \le r(\phi)}(-\text{div}(\nabla I(\rho,\phi))),$$

and $w_d$ is the corresponding divergence weight value. Adding the weighted divergence of gradient term to the energy calculation can help detect a boundary between two organs, such as a uterus-bladder boundary. Thus, as shown in FIG. 9B, base unit 120 may use the negative divergence of gradient along each radial line 14 to correctly place nodes 16 along uterus-bladder boundary 910.

Figure 10B:
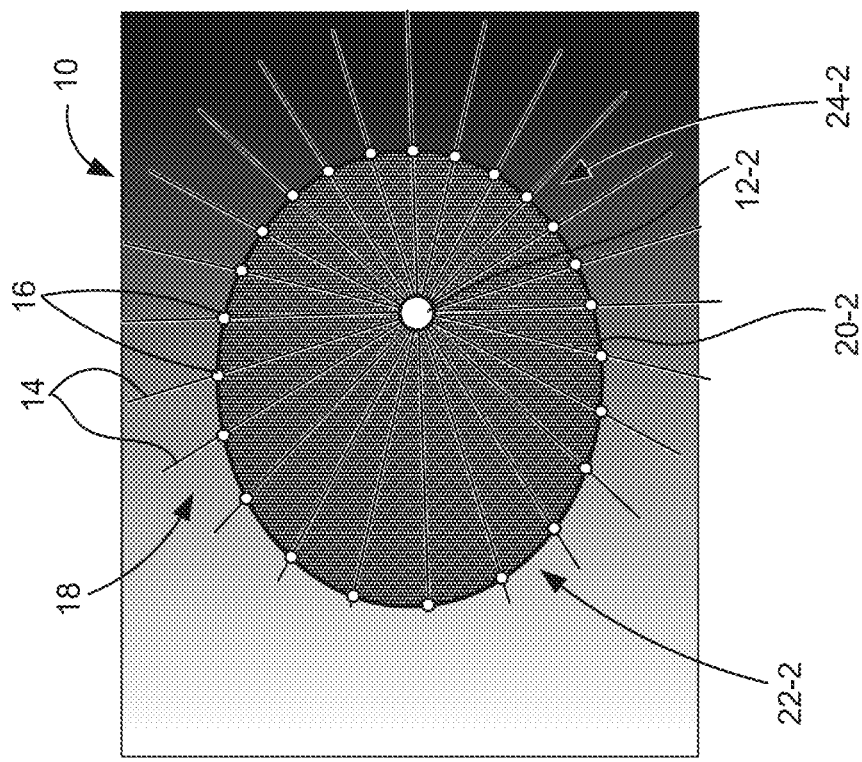
FIGS. 10A and 10B are simplified diagrams illustrating contours for the same organ with different centroids.
Figure 10A:
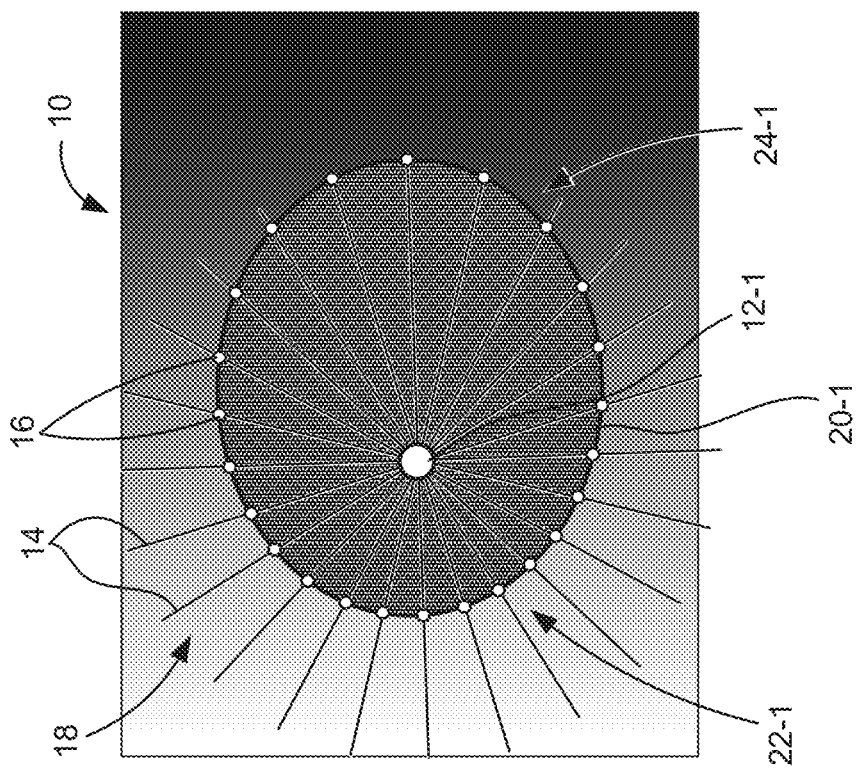

An active contour model with dynamic programming in polar coordinates inherently requires a centroid position as prior information, and the centroid position could be inaccurate at times. The total energy equation in the previous section depends highly on the location of the centroid. For example, FIGS. 10A and 10B show two contours for the same organ with different centroids, 12-1 and 12-2. On the contour 20-1 in FIG. 10A, more nodes 16 are concentrated on the left-side wall 22-1 that has a large gradient (e.g., in comparison with the right-side wall 24-1), while the contour 20-2 in FIG. 10B results in more nodes concentrated on the right-side wall 24-2 with a smaller gradient (e.g., in comparison with the left-side wall 22-2). So, the final cost for the contour 20-1 in FIG. 10A would be much lower than that of the contour 20-2 in FIG. 10B, although both of the contours are for the same organ. In other words, walls close to the centroid 12 tend to have a greater effect on the final cost value than those far from the center. To eliminate this disproportionate impact, external energy can be normalized by radius (i.e., distance from the centroid 12 to each node 16) as described in the following equation:

$$E_{total}(r(\phi)) = \int_0^{2\pi} (w_i \cdot E_i(r(\phi)) + w_e \cdot r(\phi) \cdot E_e(r(\phi))) + w_d \cdot E_d(r(\phi)))d\phi.$$

This normalization is also useful to make the cost value more stable regardless of the organ size. For example, the normalization process makes the final cost the same for two organs with the same gradient at the wall but with different sizes.

While the total energy equation above relies on a divergence of gradient, in another implementation, $E_{total}$ may be generalized such that any feature different from the main one used for the external energy can be used for the additional energy term $E_d$. Possible features include, but are not limited to, pixel intensity value, mean intensity from the centroid to the point, local image contrast, output of line/blob detector (e.g., Sobel edge detector, Laplacian of Gaussian, determinant of the Hessian, etc.), or more advanced features such as Frangi vesselness or scale-invariant feature transform (SIFT). Thus, in other implementations, these additional features can be applied to improve the active contour to be more sensitive/insensitive to certain conditions (e.g., dark/bright regions, uterus-bladder boundary, bone shadow, muscle-fat layer, etc.).

Figure 11B:
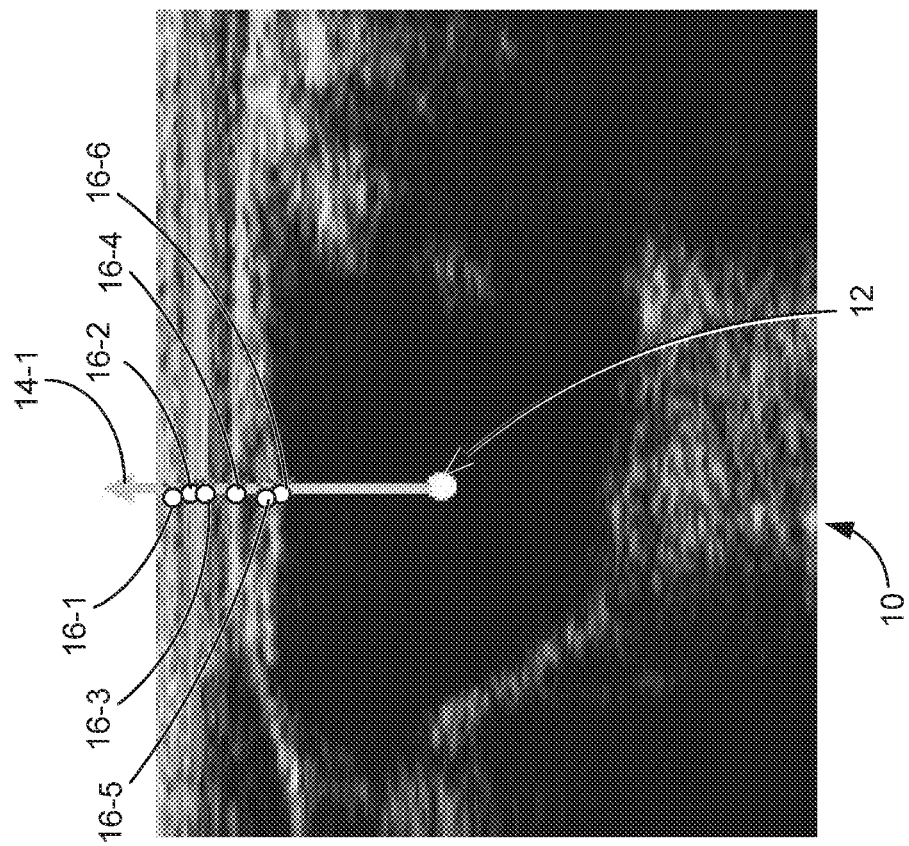
FIGS. 11A and 11B illustrate a radial line crossing local gradient peak points in an image obtained by the scanning system of FIGS. 1A and 1B.
Figure 11A:
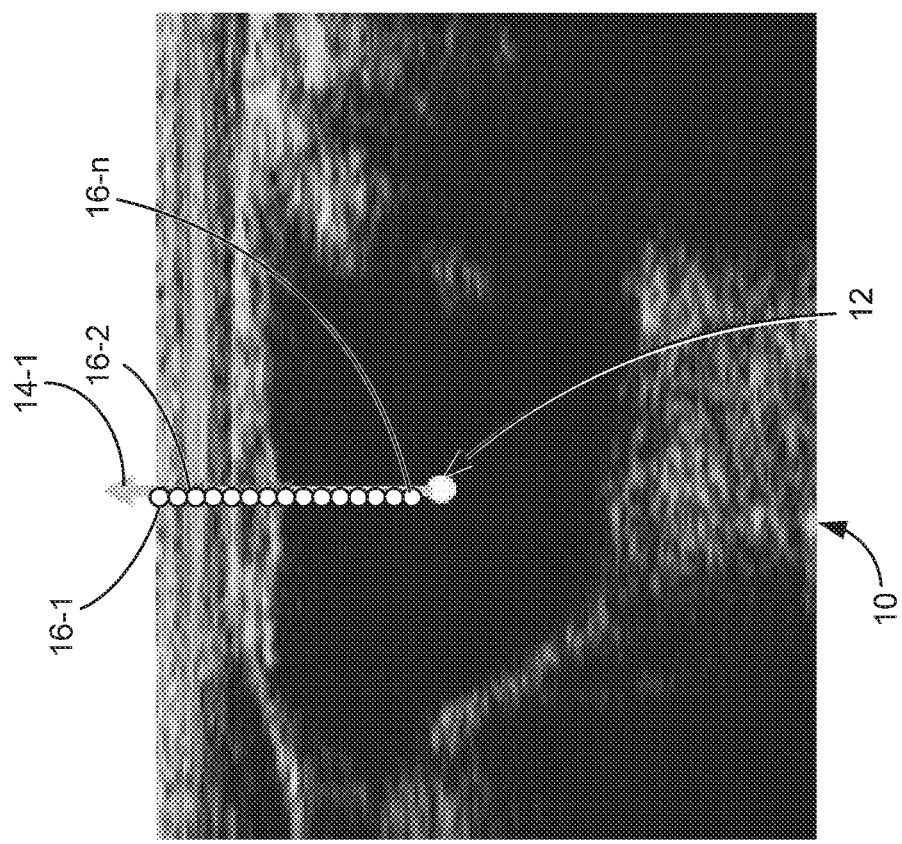

Typically, an active contour model is applied to find an open-ended trace. As shown, for example in FIGS. 10A and 10B, contour 20 for an organ, such as a bladder outline, is a closed contour. Thus, to find the optimal closed path, active contour models using dynamic programming may be repeated multiple times varying the first node position. For example, as shown in FIG. 11A, multiple positions of node 16 (e.g., 16-1 through 16-n) may be tested as an optimal starting point and ending point along radial line 14. For each possible first node position, p, along the starting radial line, base unit 120 may perform dynamic programming to find the optimal path from that particular starting node. Base unit 120 may then select the lowest cost path among the optimal paths for each of starting nodes 16-1 through 16-n to determine the final path for contour 20.

According to the number of possible node positions along the first radial line 14, this iterative process can make the dynamic programming algorithm tens or hundreds of times slower than a single dynamic programming cycle for an open contour. To reduce the number of iterations, strong candidates for the first node position can be selected before the looping operation. For some organs, known propensities may be applied. For example, for a bladder, a radial line going upward from centroid 12 crosses the bladder wall in most of the cases, as shown in FIG. 11B. As the image around the front bladder wall (e.g., typically located at the top of the ultrasound image 10) generally tends to be clean (e.g., with little noise), it is likely that the front bladder wall is located at one of the local gradient peak points on the radial line 14-1. As a pre-processing step, base unit 120 may find the local gradient peak points on a radial line extending upward (e.g., radial line 14-1). Thus, dynamic programming can be performed for nodes only at local gradient peak points (e.g., nodes 16-1 through 16-6 in FIG. 11B), eliminating numerous unlikely starting node candidates and increasing the speed of dynamic programming contour identification.

Referring again to FIGS. 10A and 10B, due to the nature of ultrasound images, characteristics of bladder walls can change according to location. For example, front/back walls typically have more contrast than side walls. In addition, back walls tend to be sharper than front walls when reverberation exists (e.g., when an ultrasound beam reflects back and forth between reflectors causing a false indication of depth). In terms of contour smoothness, the front wall tends to be more flat while the back wall can have sharp humps. Referring again to FIGS. 9A and 9B regarding the uterus-bladder boundary (e.g., boundary 910), it is unlikely that a radial line 14 going upward crosses the boundary. Based on these observations, different weight values may be applied according to the radial angle ($\phi$) of a node 16 as follows:

$$E_{total}(r(\phi)) = \int_0^{2\pi} (w_i(\phi) \cdot E_i(r(\phi)) + w_e(\phi) \cdot r(\phi) \cdot E_e(r(\phi)) + w_d(\phi) \cdot E_d(r(\phi)))d\phi.$$

Thus, the weighted cost of external energy, the weighted cost of internal energy, and the weighted cost for divergence at the candidate node can vary based on a radial angle of the radial line 14 for the candidate node 16. For example, using large internal weight values ($w_i$) for nodes 16 located upward from centroid 12 (e.g., toward the bladder wall) may be efficient to make the front wall of a bladder more flat and robust to reverberation. Large external weight values ($w_e$) for nodes 16 down from centroid 12 may be helpful to detect clear back walls typical for a bladder. Using small divergence weight values ($w_d$) for nodes 16 located upward from centroid 12 may reduce the risk of misdetecting reverberation as a bladder-uterus boundary.

Figure 12C:
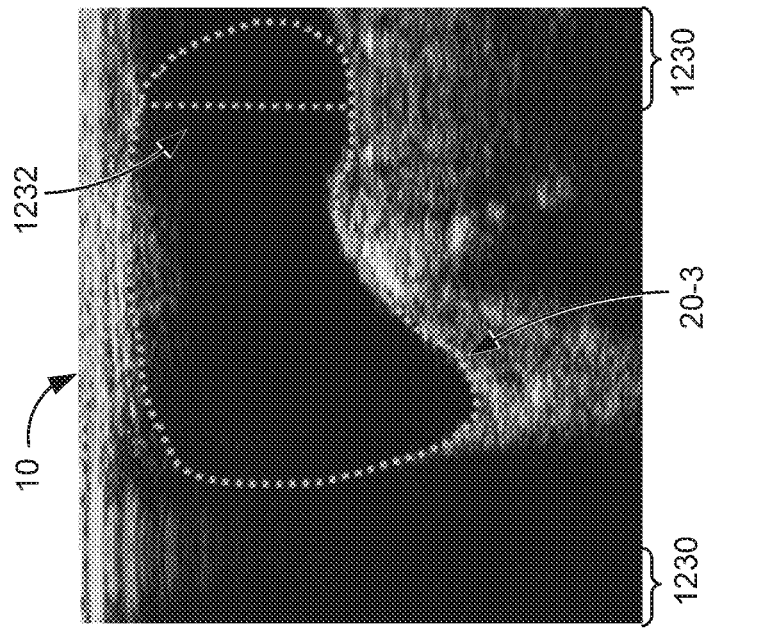
FIGS. 12A-12C illustrate compensation techniques for addressing missing wall portions in an image obtained by the scanning system of FIGS. 1A and 1B.
Figure 12B:
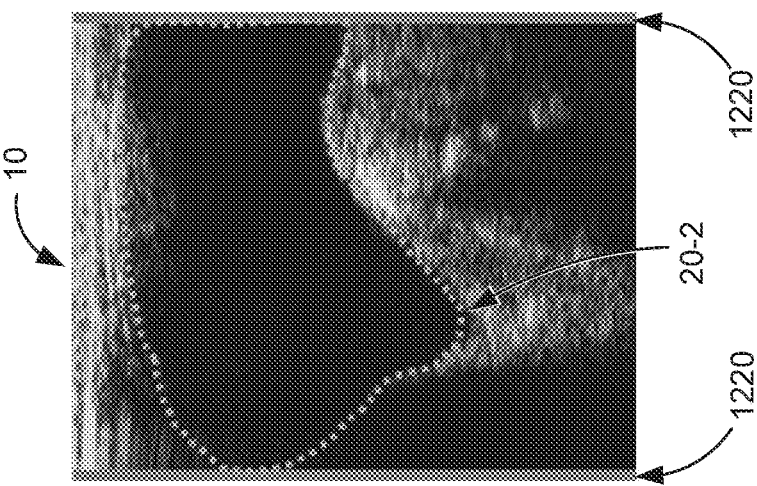
Figure 12A:
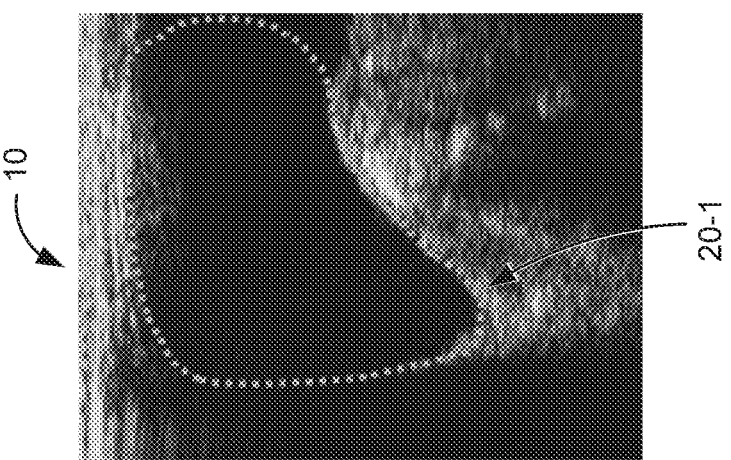

FIG. 12A illustrates a contour 20-1 applied to an image 10. FIG. 12B illustrates a contour 20-2 applied to image 10 with line padding. FIG. 12C illustrates a contour 20-3 applied to image 10 with mirroring. In some cases with very large bladders or poor probe aiming, dynamic programming results tend to be inaccurate, as illustrated in FIG. 12A, because side walls that should pull out the contour 20-1 are missing. A simple solution to the problem of FIG. 12A is padding bright outlines (e.g., lines 1220) to the left and right side of B-mode image 10 to work as virtual side walls, as shown in FIG. 12B. While the approach of FIG. 12B, could fix the missing wall problem as shown on the right side in contour 20-2 of the FIG. 12B, a false result may be produced when a side wall is merely missing in a shadow, as shown on the left side of contour 20-2. Thus, as another alternative, or as a supplementary method, B-mode mirroring can be used, as illustrated in FIG. 12C. As shown in FIG. 12C, horizontal mirrored portions 1230 at either side of image 10 may be added to the original image. Although mirroring does not recover the side wall, it extends the front and back walls to make the bladder contour larger without concern for detection of a false wall. In the final contour 20-3, nodes outside the original B-mode image 10 can be cropped along mirror line 1232 in FIG. 12C.

FIG. 13 is a diagram illustrating exemplary physical components of base unit 120. Base unit 120 may include a bus 1310, a processor 1320, a memory 1330, an input component 1340, an output component 1350, and a communication interface 1360.

Bus 1310 may include a path that permits communication among the components of base unit 120. Processor 1320 may include a processor, a microprocessor, or processing logic that may interpret and execute instructions. Memory 1330 may include any type of dynamic storage device that may store information and instructions (e.g., software 1335), for execution by processor 1320, and/or any type of non-volatile storage device that may store information for use by processor 1320.

Software 1335 includes an application or a program that provides a function and/or a process. Software 1335 is also intended to include firmware, middleware, microcode, hardware description language (HDL), and/or other form of instruction.

Input component 1340 may include a mechanism that permits a user to input information to base unit 120, such as a keyboard, a keypad, a button, a switch, a touch screen, etc. Output component 1350 may include a mechanism that outputs information to the user, such as a display, a speaker, one or more light emitting diodes (LEDs), etc.

Communication interface 1360 may include a transceiver that enables base unit 120 to communicate with other devices and/or systems via wireless communications, wired communications, or a combination of wireless and wired communications. For example, communication interface 1360 may include mechanisms for communicating with another device or system, such as probe 110, via a network, or to other devices/systems, such as a system control computer that monitors operation of multiple base units (e.g., in a hospital or another type of medical monitoring facility). In one implementation, communication interface 1360 may be a logical component that includes input and output ports, input and output systems, and/or other input and output components that facilitate the transmission of data to/from other devices.

Base unit 120 may perform certain operations in response to processor 1320 executing software instructions (e.g., software 1335) contained in a computer-readable medium, such as memory 1330. A computer-readable medium may be defined as a non-transitory memory device. A non-transitory memory device may include memory space within a single physical memory device or spread across multiple physical memory devices. The software instructions may be read into memory 1330 from another computer-readable medium or from another device. The software instructions contained in memory 1330 may cause processor 1320 to perform processes described herein. Alternatively, hardwired circuitry, such as an application-specific integrated circuit (ASIC), a field-programmable gate array (FPGA), etc., may be used in place of or in combination with software instructions to implement processes described herein. Thus, implementations described herein are not limited to any specific combination of hardware circuitry and software.

Base unit 120 may include fewer components, additional components, different components, and/or differently arranged components than those illustrated in FIG. 13. As an example, base unit 120 may include one or more switch fabrics instead of, or in addition to, bus 1310. Additionally, or alternatively, one or more components of base unit 120 may perform one or more tasks described as being performed by one or more other components of base unit 120.

Systems and methods described herein use active contour models with dynamic programming techniques that apply a 2-D gradient vector to calculate the optimal cost path for an organ in an ultrasound image. In one implementation, a divergence of gradient term can be added to the active contour energy calculation to help detection of a boundary between adjacent organs. Energy (e.g., cost) normalization by radius size can be applied to make the energy calculation less sensitive to the centroid location. To speed contour selection in application of a closed contour, pre-processing may be applied to select a limited number of starting point candidates at local gradient peak points along certain radial lines most likely to have clean boundaries. Furthermore, horizontal image mirroring may be applied to improve large bladder detection performance.

While implementations described herein have be described in the context of active contour models using dynamic programing, in other implementations different search/optimization methods other than dynamic programming may be used with the application of 2D gradient vectors. For example, exhaustive search, or some heuristics to find local minima, such as the Monte-Carlo method, could be used instead of dynamic programming within the active contour framework. Thus, implementations described herein are not limited to active contour models using dynamic programming and instead can be applied to an active contour model that applies 2D gradient vectors to a contour search/optimization method.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

What is claimed is:

1. A method for determining a contour of an organ in an ultrasound image, the method comprising:
   detecting an organ within the ultrasound image;
   identifying a centroid location for the organ;

extending, by a processor of a base unit, a set of radial lines from the centroid location beyond an expected organ boundary;

calculating, by the processor, cost values at candidate nodes on each radial line, of the set of radial lines, using features that are calculated in a direction along vectors that are perpendicular to projected contour lines between adjacent nodes on different radial lines of the set of radial lines, wherein the cost values include a summation of internal and external energies; and selecting, by the processor, a final organ boundary contour based on a cost function analysis of paths through the candidate nodes.

2. The method of claim 1, wherein calculating cost values at candidate nodes on each radial line includes:

identifying a relative position of one candidate node and another node on adjacent radial lines of the set of radial lines;

projecting a contour line between the one candidate node and the other node;

defining, at the one candidate node, a normal vector in a direction perpendicular to the projected contour line; and determining a weighted cost of external energy for the one candidate node based on a value along the normal vector.

3. The method of claim 2, wherein calculating cost values at candidate nodes on each radial line further includes:

determining a weighted cost of internal energy for the one candidate node; and summing the weighted cost of external energy and the weighted cost of internal energy for the one candidate node.

4. The method of claim 3, wherein a weight applied to the weighted cost of external energy and a weight applied to the weighted cost of internal energy for the candidate node vary based on a radial angle of the radial line for the candidate node.

5. The method of claim 3, wherein calculating cost values at candidate nodes on each radial line further includes:

identifying a divergence of gradient for the one candidate node to represent a possible boundary of two organs in the one candidate node.

6. The method of claim 5, wherein the boundary of two organs includes a uterus-bladder boundary.

7. The method of claim 3, wherein calculating cost values at candidate nodes on each radial line further includes:

identifying a radius value from the centroid location to each of the candidate nodes; and normalizing the external energy cost for each of the candidate nodes based on the radius value.

8. The method of claim 1, wherein the organ includes a bladder.

9. The method of claim 1, wherein the features that are calculated in a direction along the vectors that are perpendicular to projected contour lines between adjacent nodes on different radial lines include one or more of a gradient, a higher-order derivative, a Gabor filter output, or a multidirectional wavelet filter output.

10. The method of claim 1, wherein selecting the final organ boundary contour based on the cost function analysis of paths through the candidate nodes comprises:

identifying local gradient peak points on one of the radial lines extending through an area with a propensity for a clean boundary; and applying the local gradient peak points as starting points for the cost function analysis.

11. The method of claim 1, wherein detecting the organ within the ultrasound image further comprises:

detecting a missing side wall for a cavity of the organ, mirroring a portion of the organ cavity along a line where the side wall is missing; and wherein selecting the final organ boundary contour comprises cropping nodes within the mirrored portion at the line.

12. A device, comprising:

a communication interface for receiving an ultrasound image;

a memory device for storing instructions; and a processor configured to execute the instructions to:

detect an organ within the ultrasound image, obtain a centroid position for the organ, extend a set of radial lines from the centroid position beyond an expected organ boundary, determine cost values at candidate nodes on each radial line, of the set of radial lines, using features that are calculated in a direction along vectors that are perpendicular to projected contour lines between adjacent nodes on different radial lines of the set of radial lines, wherein the cost values include a summation of internal and external energies, and select a final organ boundary contour based on a cost function analysis of paths through the candidate nodes.

13. The device of claim 12, wherein, when determining cost values at candidate nodes on each radial line, the processor is further configured to execute the instructions to:

identify a relative position of one candidate node and another node on adjacent radial lines of the set of radial lines, project a contour line between the one candidate node and the other node, define, at the one candidate node, a normal vector in a direction perpendicular to the projected contour line, and determine a cost of external energy for the one candidate node based on a gradient value along the normal vector.

14. The device of claim 13, wherein, when determining cost values at candidate nodes on each radial line, the processor is further configured to execute the instructions to:

determine a cost of internal energy for the one candidate node, and sum the external energy cost and the internal energy cost for the one candidate node.

15. The device of claim 14, wherein, when summing the external energy cost and the internal energy cost, the processor is further configured to execute the instructions to:

add a weight factor to the external energy cost and a different weight factor to the internal energy cost.

16. The device of claim 13, wherein, when determining cost values at candidate nodes on each radial line, the processor is further configured to execute the instructions to:

identify a radius value from the centroid position to each of the candidate nodes; and normalize the external energy cost for each of the candidate nodes based on the radius value.

17. The device of claim 12, wherein, when selecting the final organ boundary contour based on the cost function analysis of paths through the candidate nodes, the processor is further configured to execute the instructions to:

identify local gradient peak points on one of the radial lines extending through an area with a propensity for a clean boundary; and apply the local gradient peak points as starting points for the cost function analysis.

18. The device of claim 12, wherein, when determining cost values at candidate nodes on each radial line, the processor is further configured to execute the instructions to:
identify a divergence of gradient for the candidate nodes to represent a possible uterus-bladder boundary in the candidate node.

19. A non-transitory computer-readable medium containing instructions executable by at least one processor, the computer-readable medium comprising one or more instructions to:
detect an organ cavity within an ultrasound image,
obtain a centroid position for the cavity;
extend a set of radial lines from the centroid position beyond an expected cavity-tissue interface;
determine cost values at candidate nodes on each radial line, of the set of radial lines, using features that are calculated in a direction along vectors that are perpendicular to projected contour lines between adjacent nodes on different radial lines of the set of radial lines, wherein the cost values include a summation of internal and external energies; and
select a final organ boundary contour based on a cost function analysis of paths through the candidate nodes.

20. The non-transitory computer-readable medium claim 19, wherein the instructions to determine cost values at candidate nodes on each radial line further comprise one or more instructions to:
identify a relative position of one candidate node and another node on adjacent radial lines of the set of radial lines;
project a contour line between the one candidate node and the other node;
define, at the one candidate node, a normal vector in a direction perpendicular to the projected contour line;
determine a cost of external energy for the one candidate node based on a gradient value along the normal vector;
determine a cost of internal energy for the one candidate node; and
sum the external energy cost and the internal energy cost for the one candidate node.

* * * * *